(12) United States Patent
Shao

(10) Patent No.: US 9,092,725 B2
(45) Date of Patent: Jul. 28, 2015

(54) CLASSIFYING ATTRIBUTE DATA INTERVALS

(71) Applicant: Alibaba Group Holding Limited, Grand Cayman (KY)

(72) Inventor: Jidong Shao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 300 days.

(21) Appl. No.: 13/689,447

(22) Filed: Nov. 29, 2012

(65) Prior Publication Data

US 2013/0138598 A1    May 30, 2013

(30) Foreign Application Priority Data

Nov. 29, 2011 (CN) .......................... 2011 1 0387773

(51) Int. Cl.
*G06N 7/00* (2006.01)
*G06F 17/30* (2006.01)
*G06N 99/00* (2010.01)
*G06K 9/62* (2006.01)

(52) U.S. Cl.
CPC .......... *G06N 7/005* (2013.01); *G06F 17/30702* (2013.01); *G06N 99/005* (2013.01); *G06K 9/6269* (2013.01)

(58) Field of Classification Search
USPC ................................................... 706/20, 52
See application file for complete search history.

(56) References Cited

U.S. PATENT DOCUMENTS

| | | |
|---|---|---|
| 2002/0010691 A1 | 1/2002 | Chen |
| 2002/0022956 A1 | 2/2002 | Ukrainczyk et al. |
| 2005/0137991 A1 | 6/2005 | Bruce et al. |

(Continued)

FOREIGN PATENT DOCUMENTS

WO    WO0070481    11/2000

OTHER PUBLICATIONS

West93, Approximating Posterior Distributions by Mixtures [online], J. R. Statist. Soc. B (1993) [retrieved on Nov. 16, 2014]. Retrieved from the Internet:<URL:https://www.google.com/url?sa=t&rct=j&q=&esrc=s&frm=1&source=web&cd=1&cad=rja&uact=8&ved=0CCUQFjAA&url=https%3A%2F%2Fstat.duke.edu%2F~mw%2FMWextrapubs%2FWest1993b.pdf>.*

(Continued)

*Primary Examiner* — Jeffrey A Gaffin
*Assistant Examiner* — Nathan Brown, Jr.
(74) *Attorney, Agent, or Firm* — Lee & Hayes, PLLC

(57) ABSTRACT

The present techniques extract attribute data of one or more classified members for one or more user attributes. With respect to a particular user attribute of the one or more user attributes, the present techniques determine initial attribute data intervals corresponding to the particular user attribute based on attribute data and classes of the classified members from the extracted attribute data. With respect to a classified member whose attribute data is missing for the particular user attribute, the present techniques set the attribute data as a preset missing value. The present techniques then merge the preset missing value into each of the initial user attribute data intervals and calculate a Maximum Posteriori Probability (MAP) Bayes estimate value respectively, and determine initial user attribute data intervals with a smallest MAP Bayes estimated value as final attribute data intervals corresponding to the particular user attribute.

20 Claims, 6 Drawing Sheets

(56) References Cited

U.S. PATENT DOCUMENTS

| | | |
|---|---|---|
| 2005/0234837 A1 | 10/2005 | Ramachandran et al. |
| 2007/0011183 A1 | 1/2007 | Langseth et al. |
| 2007/0055571 A1 | 3/2007 | Fox et al. |
| 2008/0065694 A1 | 3/2008 | Qian |
| 2008/0222129 A1 | 9/2008 | Komatsu et al. |
| 2008/0281770 A1 | 11/2008 | Ricketts |
| 2008/0300964 A1 | 12/2008 | Raghunandan |
| 2009/0259505 A1 | 10/2009 | Tadayon |
| 2010/0312837 A1 | 12/2010 | Bodapati et al. |
| 2011/0029620 A1 | 2/2011 | Bonforte |

OTHER PUBLICATIONS

Steele10, Inference from multiple imputation for missing data using mixtures of normals [online], Statistical Methodology 7 (2010) 351-365 [retrieved on Nov. 16, 2014]. Retrieved from the Internet:<URL: http://www.sciencedirect.com/science/article/pii/S1572312710000043/pdfft?md5=8bcf18d27402710c1bb726990facc1c0&pid=1-s2.0-S1572312710000043-main.pdf>.*

PCT Search Report mailed Jun. 11, 2013 for PCT application No. PCT/US12/67090, 8 pages.

\* cited by examiner

CLASSIFYING ATTRIBUTE DATA INTERVALS

CROSS REFERENCE TO RELATED PATENT APPLICATIONS

This application claims foreign priority to Chinese Patent Application No. 201110387773.6 filed on 29 Nov. 2011, entitled "Method and Apparatus of Classifying Attribute Data Intervals," which is hereby incorporated by reference in its entirety.

TECHNICAL FIELD

The present disclosure relates to the field of member classification technology and, more specifically, to a method and an apparatus of classifying attribute data interval.

BACKGROUND

The conventional techniques classify users of a website into members and non-members based on whether the users register at the website. When a member registers at the website, the website may require the member to submit user attributes data, such as age, registration date, gender, location, registration source, industry, etc. The website stores user attributes data corresponding to an identification of the member at a database. Generally, a record stores the user attribute data of various attributes of the member as shown in Table 1.

TABLE 1

| User Identification | Age | Registration Date | Gender | Location |
| --- | --- | --- | --- | --- |
| Member A | 29 | Nov. 17, 2011 | Female | Beijing |
| Member B | 36 | May 1, 2010 | Male | Shanghai |
| Member C | 19 | Mar. 5, 2009 | Female | Tianjin |

In Table 1, each row represents a record. Each field of the record stores attribute data that the member submits for one user attribute. For example, the "age" field in each record stores attribute data that the members submit for the user attribute "age."

As there may be huge differences among the attribute data that the members submit for their user attributes, the website may classify the members based on the attribute data of the user attributes. Generally, the members are classified into two classifications. One is a main classification and the other is a secondary classification. For example, the members may be classified as active members and non-active members. The active members are the main classification and the non-active members are the secondary classification. Corresponding services may then be provided to the members based on their classifications.

The conventional techniques, when classifying the members, obtain multiple attribute data interval of each user attribute based on a large volume of already-classified members' attribute data. For example, the attribute data intervals of the "age" user attribute may be three, such as [10, 20], (20, 40], (40, 60]. The attribute data intervals of the "location" user attribute may be four, such as {Beijing, Shanghai, Tianjin, Chongqing}, {Hebei, Henan, Shanxi}, {Fujian, Jiangxi, Zhejiang}, and {Anhui, Gansu, Shandong}. The attribute data intervals of the "registration date" user attribute may be three, such as [1 Jan. 2001, 31 Dec. 2005], (1 Jan. 2006, 31 Dec. 2010], (1 Jan. 2011, 31 Dec. 2015]. After the multiple attribute date intervals for each user attribute are obtained, with respect to each user attribute, a Boolean characteristic is assigned to each attribute data interval. Each Boolean characteristic has its unique characteristic identification.

The conventional techniques, when classifying a member for classification or a member to be classified in real time, determine an attribute data interval of attribute data of the member for classification for each user attribute. The corresponding Boolean characteristic of the determined attribute data is assigned value 1 and the characteristic identification of the Boolean characteristic whose value is 1 is stored. For each user attribute, after the corresponding characteristic identification of the Boolean characteristic is extracted, based on weight values of each of the Boolean characteristics, a probability that the member for classification is classified into the main classification is calculated. If the probability is higher than 50%, the member for classification is classified into the main classification. If the probability is not higher than 50%, the member for classification is classified into the secondary classification.

FIG. 1 illustrates a flowchart of an example method of determining an attribute data interval of a user attribute in accordance with the conventional techniques.

At 102, a large volume of attribute data of classified members is extracted as training data. At 104, for each user attribute, each attribute data corresponding to the user attribute is treated as a separate attribute data interval. At 106, based on a Maximum Posteriori Probability (MAP) Bayes estimate rule, an evaluation value of attribute data interval classified at 104 is calculated. At 108, the adjacent intervals are merged to obtain multiple data attribute intervals and another evaluation value of the merged attribute data interval is calculated.

At 110, if the evaluation value obtained at 106 is smaller than the evaluation value obtained at 108, the attribute data intervals obtained at 104 are determined as the final attribute data intervals of the user attribute.

At 112, if the evaluation value obtained at 106 is bigger than or equal to the evaluation value obtained at 108, the attribute data intervals obtained at 104 are retained and the adjacent interval are continuously merged until reaching a classification of attribute data intervals with a smallest evaluation value. The obtained attribute data intervals from the classification with smallest evaluation value are determined as the final attribute data intervals of the user attribute.

The conventional techniques classify the attribute data intervals of the user attribute based on the attribute data from the training data. The conventional techniques then determine the attribute data interval of the attribute data of the member for classification. However, when the member registers at the website, he/she may not fill in the attribute data for some user attributes. For example, if the member does not submit the attribute data for the user attribute "age," the attribute data of the "age" user attribute is missing in the record of the user stored at the website. In future classification, the attribute data interval of the attribute data of the user for such user attribute cannot be accurately determined, and thus the member cannot be accurately classified. Therefore, the accuracy rate of the conventional techniques to classify attribute data intervals is low.

SUMMARY

This Summary is provided to introduce a selection of concepts in a simplified form that are further described below in the Detailed Description. This Summary is not intended to identify all key features or essential features of the claimed subject matter, nor is it alone intended to be used as an aid in determining the scope of the claimed subject matter. The term "techniques," for instance, may refer to device(s), system(s), method(s) and/or computer-readable instructions as permitted by the context above and throughout the present disclosure.

The present disclosure provides a method and an apparatus of classifying attribute data intervals. Multiple attribute data of classified members for one or more user attribute are extracted. For each user attribute, the following operations are performed. Based on the attribute data of a particular user attribute and member classifications of the classified members, initial attribute data intervals of the particular user attribute are determined. With respect to a classified member whose attributed data for the particular user attribute is missing, attribute data of the classified member for the particular user attribute is set as a preset missing value. The preset missing value is then merged into each of the determined initial attribute data intervals. The MAP Bayes evaluation value is calculated for each classification respectively when a respective initial attribute data interval is merged with the preset missing value respectively. Attribute data intervals with the least MAP Bayes evaluation value are determined as final attribute intervals corresponding to the particular user attribute.

The present disclosure also provides an apparatus of classifying attribute data intervals. The apparatus may include an attribute data extraction unit, a first initial attribute data interval determination unit, a missing value setting unit, a first evaluation value calculation unit, and a first final attribution data interval determination unit. The attribute data extraction unit extracts attribute data of multiple classified members for one or more user attributes. The first initial attribute data interval determination unit, for each user attribute, based on the attribute data of a particular user attribute and member classifications of the classified members, determines initial attribute data intervals of the particular user attribute. With respect to a classified member whose attributed data is missing for the particular user attribute, the missing value setting unit sets attribute data of the classified member for the particular user attributed as a preset missing value. The first evaluation value calculation unit merges the preset missing value into each of the initial attribute data intervals determined by the first initial attribute data interval unit and calculates a MAP Bayes evaluation value for each classification respectively when a respective initial attribute data interval is merged with the preset missing value respectively. The final attribute data interval determination unit determines attribute data intervals with a least MAP Bayes evaluation value as final attribute data intervals corresponding to the particular user attribute.

Under the present techniques disclosed by the present disclosure, the website may extract the attribute data of one or more classified members for one or more user attributes. For each user attribute, the website determines initial attribute data intervals corresponding to the particular user attribute. With respect to the classified member whose attribute data is missing for the particular attribute, the website sets the attribute data of the classified member for the particular user attributed as a preset missing value, merges the preset missing value into each of the determined initial attribute data intervals respectively, calculates the MAP Bayes evaluation value each time when the respective initial attribute data interval is merged with the preset missing value respectively, and determines the attribute data intervals with a least MAP Bayes evaluation value as the final attribute data intervals corresponding to the particular user attribute. The present techniques, when classifying the attribute data intervals, consider the possibility that the attribute data of one or more classified members for the particular user attribute may be missing, thereby improving the accuracy of classification of the attribute data intervals. The present techniques avoid the inaccuracy problem when there is missing attribute data of the members, thereby improving the accuracy of member classification

BRIEF DESCRIPTION OF THE DRAWINGS

To better illustrate embodiments of the present disclosure, the following is a brief introduction of figures to be used in descriptions of the embodiments. It is apparent that the following figures only relate to some embodiments of the present disclosure. A person of ordinary skill in the art can obtain other figures according to the figures in the present disclosure without creative efforts.

DETAILED DESCRIPTION

The following is a detailed description of the present techniques by reference to the FIGs. The described embodiments herein are example embodiments and should not be used to restrict the scope of the present disclosure.

Figure 1:
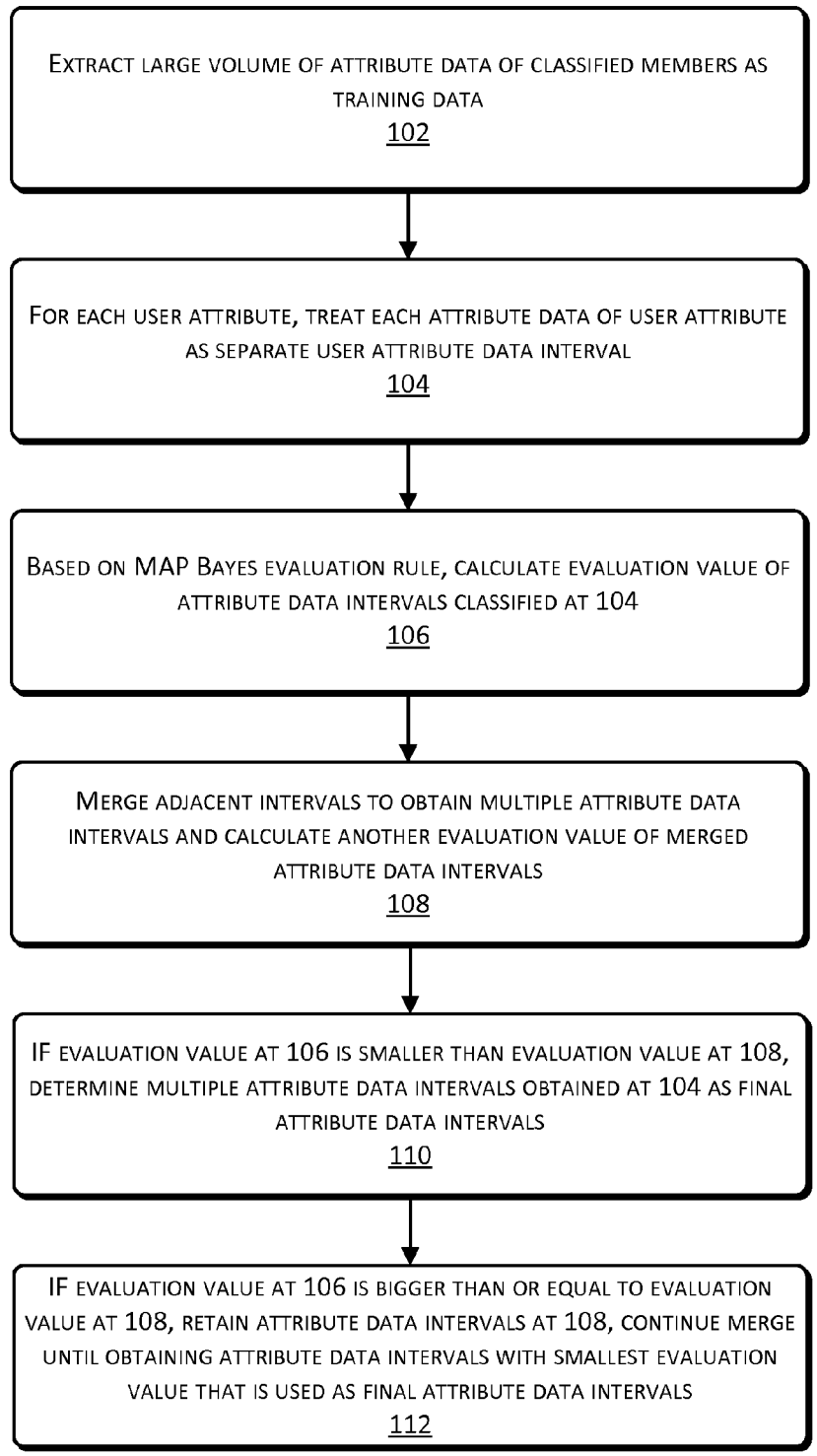
FIG. 1 illustrates a flowchart of an example method of determining attribute data intervals of a user attribute in accordance with the conventional techniques.
Figure 2:
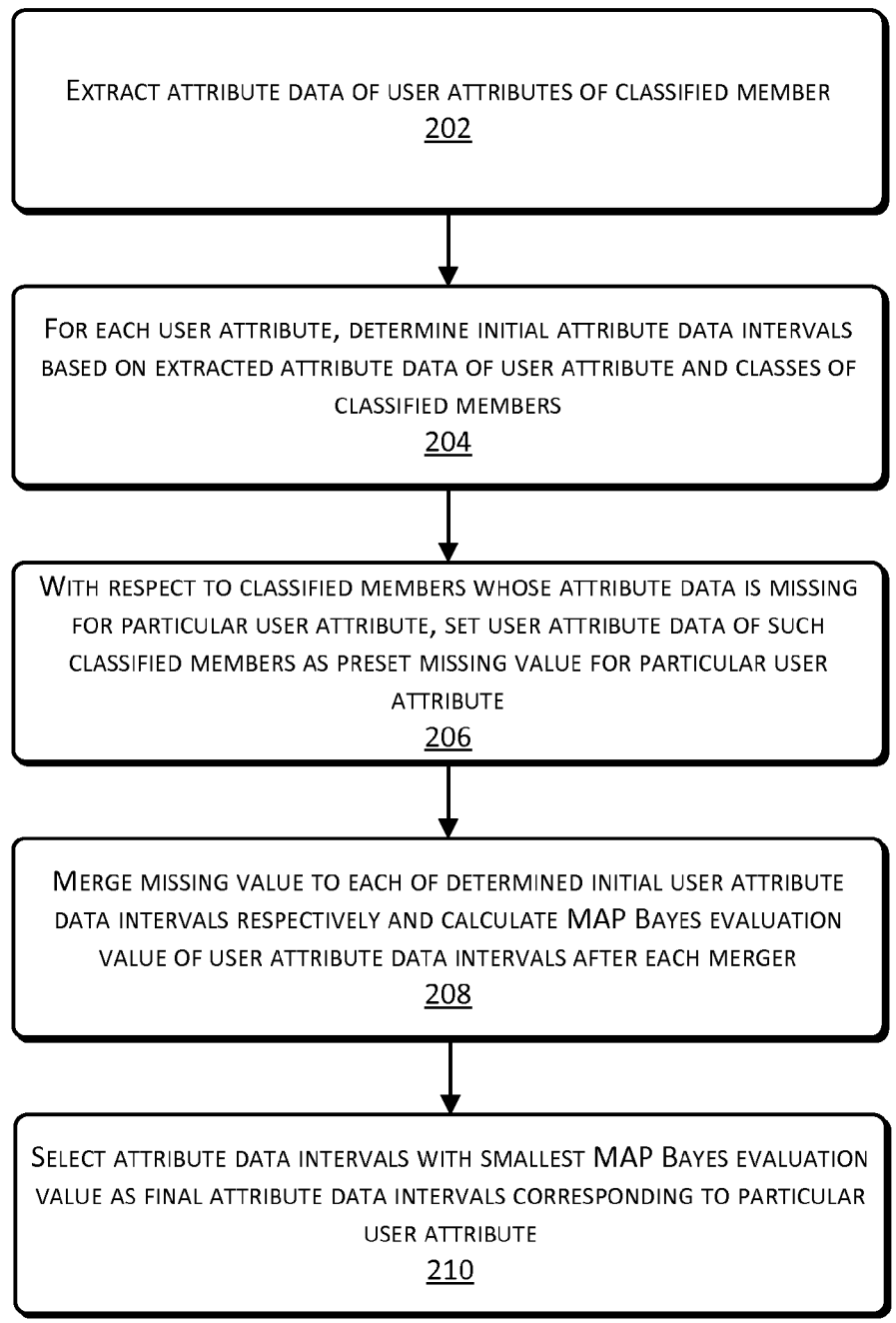
FIG. 2 illustrates a flowchart of an example method of classifying attribute data intervals in accordance with a first example embodiment of the present disclosure.

FIG. 2 illustrates a flowchart of an example method of classifying attribute data intervals in accordance with a first example embodiment of the present disclosure.

At 202, attribute data of classified members for one or more user attributes are extracted. When the attribute data intervals are classified offline or for training, the attribute data of classified members for the user attributes are used as training data. The present techniques may use various methods to learn from the training data to obtain various attribute data intervals.

For example, the attribute data of classified members for the user attributes may be pre-stored in a database. One record may store attribute data of a member for various user attributes. The user attributes may include, but are not limited to, age, registration date, gender, location, registration source, industry, etc.

There are various methods to extract the attribute data from the database. For example, a pre-defined number of records of classified members stored at the database may be randomly extracted. The pre-defined number may be preset. For instance, the pre-defined number may be set by considering the size of device memory. When there is sufficient memory, the pre-defined number should be as large as possible. In an example of M megabytes device memory, a length of each field of attribute data is 4 bytes, the pre-defined number may be set to satisfy the following condition:

$$\text{a number of records} \times \text{a number of fields} < \frac{M}{4} \times 10^6$$

To ensure the extracted attribute data has statistical meaning, the extracted records for each class of members shall be larger than the pre-defined number. For example, the members may be classified into a main class and a secondary class. The pre-defined number of records is 100. The records extracted from each of the main class and the secondary class may be larger than 100 respectively.

At 204, for each particular user attribute, initial attribute data intervals corresponding to the particular user attribute are determined based on user attribute data corresponding to the particular user attribute and classes of classified members.

There are various methods to determine the initial attribute data intervals corresponding to the particular user attribute. For example, a method of calculating MAP Bayes evaluation value may be used to determine the initial attribute data intervals corresponding to the particular user attribute.

For example, when the classified attribute data intervals are a1, a2, . . . , aI, where I is any positive number, the MAP Bayes evaluation value may be calculated by using:

$$\log(n) + \log\binom{n+I-1}{I-1} + \sum_{i=1}^{I} \log\binom{n_i+c-1}{c-1} + \sum_{i=1}^{I} \log(n_i!/n_{i,1}!n_{i,2}! \ldots n_{i,c}!)$$

n represents a number of extracted records for data training (which may include a number of records of the members of main classification and a number of records of the members of the secondary classification.)

$$\binom{-}{-}$$

represents a binomial coefficient, such as $$\binom{b}{a} = C_b^a.$$

I represents a number of classified data intervals. $n_i$ represents a number of records in an attribute data interval ai ($1 \le i \le I$). c represents a number of member classifications (for instance, when the member classifications include a main class and a secondary class, c is 2). $n_{i,j}$ represents a number of members j within the attribute data interval ai.

When the initial attribute data intervals corresponding to the particular user attribute are determined, each value of the attribute data of the particular user attribute is treated as a separate attribute data interval, and adjacent intervals are continuously merged until attribute data intervals with a least MAP Bayes evaluation value are obtained. For example, the following steps may be taken.

At a first step, each attribute data of the particular user attribute is treated as a separate attribute data interval. At a second step, based on the MAP Bayes estimated rule, a MAP Bayes evaluation value is calculated for the classification of attribute data intervals in the first step. At a third step, the adjacent intervals are merged to obtain multiple attribute data intervals and a MAP Bayes evaluation value is calculated for the classification of attribute data intervals in the third step.

At a fourth step, if the MAP Bayes evaluation value obtained at the second step is smaller than the MAP Bayes evaluation value obtained at the third step, the multiple attribute data intervals obtained at the first step are determined as the final attribute data intervals corresponding to the particular user attribute. At a fifth step, if the MAP Bayes evaluation value obtained at the second step is larger than or equal to the MAP Bayes evaluation value obtained at the third step, the multiple attribute data intervals obtained at the third step are retained and the adjacent intervals are continuously merged until a least MAP Bayes evaluation value for the classification of attribute data intervals is obtained. The attribute data intervals with the least MAP Bayes evaluation value are determined as the final attribute data intervals corresponding to the particular user attribute.

In the first example embodiment of the present disclosure, when the multiple initial attribute data intervals corresponding to the particular user attribute are determined, among the extracted attribute data, each of the attribute data of the particular user attribute may be converted to a corresponding code value, and the multiple initial attribute data intervals corresponding to the particular user attribute are determined according to multiple code values after the conversion and classes of classified members.

For example, the attribute data of the user attribute may have three forms, which are number, date, and set. For instance, the attribute data of the user attribute "age" is number-type attribute data. The attribute data of the user attribute "registration date" is date-type attribute data. The attribute data of the user attributes "city" or "gender" is set-type attribute data. The following describes example coding methods of different types of attribute data respectively.

One example coding method of the number-type attribute data is as follows. If the attribute data of the particular user attribute is number-type attribute data, with respect to each attribute data of the particular user attribute extracted from the attribute data, the value of the attribute data is used as its corresponding code value. For instance, the attribute data of the user attribute "age" is 20 and its corresponding code value is also 20.

One example coding method of the date-type attribute data is as follows. If the attribute data of the particular user attribute is date-type attribute data, with respect to each attribute data of the particular user attribute extracted from the attribute data, a time length between a time of the attribute data and the current time may be used as the corresponding code value of the attribute data. For example, the days between the date of the attribute data and the current date may be used as the corresponding code value of the attribute data. For instance, the current date is Nov. 18, 2011 and thus, the corresponding code value of the attribute data Nov. 1, 2011 is 17.

One example coding method of the set-type attribute data is as follows. If the attribute data of the particular user attribute is set-type attribute data, with respect to each attribute data of the particular user attribute extracted from the attribute data, a ratio value that respective attribute data belongs to the main class is calculated. Based on the ratio value from high to low, the attribute data of the particular attribute data are ranked. With respect to each attribute data of the particular user attribute extracted from the attribute data, a ranking sequence number after the ranking is used as the corresponding code value of the respective attribute data. For example, the ranking sequence numbers of the ratio values and the corresponding code values of the multiple attribute data are shown in Table 2.

TABLE 2

| Attribute Data | Attribute Data 1 | Attribute Data 2 | Attribute Data 3 |
|---|---|---|---|
| Ranking sequence number of ratio value | 2 | 3 | 1 |
| Code value | 2 | 3 | 1 |

In the first example embodiment, when the attribute data intervals are classified, if the attribute data of the user attribute is set-type attribute data, the attribute data is coded first and the coded attribute data is classified by using the same method for classifying the number-type attribute data. In contrast, under the conventional techniques, the MAP Bayes evaluation value calculation process may lead to a number beyond a maximum floating-point number, thereby causing inaccurate classification of attribute data intervals and inaccurate classification of members. Thus, the present techniques effectively improve the accuracy of classification of attribute data intervals and classification of members.

At 206, with respect to a classified member whose attribute data is missing for the particular user attribute, the attribute data of the particular user attribute of the classified member is set as a preset missing value. For example, the preset missing value may include, but is not limited to, a negative number, such as −5.

At 208, the preset missing value is merged into each of the multiple initial attribute data intervals respectively and the MAP Bayes evaluation value of the multiple initial attribute data intervals after each merger is calculated.

For example, there may be three initial attribute data intervals, which are a1, a2, and a3. After the preset missing value is merged into the initial attribute data interval a1, the MAP Bayes evaluation value is MAP Bayes evaluation value 1. After the preset missing value is merged into the initial attribute data interval a2, the MAP Bayes evaluation value is MAP Bayes evaluation value 2. After the preset missing value is merged into the initial attribute data interval a3, the MAP Bayes evaluation value is MAP Bayes evaluation value 3. The results are shown in Table 3.

TABLE 3

| Multiple Attribute Data Interval after Merged with Preset Missing Value | MAP Bayes Evaluation Value |
|---|---|
| a1 + preset missing value, a2, a3 | MAP Bayes evaluation value 1 |
| a1, a2 + preset missing value, a3 | MAP Bayes evaluation value 2 |
| a1, a2, a3 + preset missing value | MAP Bayes evaluation value 3 |

At 210, the attribute data intervals with the smallest MAP Bayes evaluation value are determined as the final attribute data intervals corresponding to the particular user attribute.

As shown in Table 3, if the MAP Bayes evaluation value 2 is the smallest, the multiple attribute data intervals, which are a1, a2+preset missing value, a3, after merged with the preset missing value, are determined as the final multiple attribute data intervals corresponding to the particular user attribute.

In another example, before the multiple attribute data intervals with the least MAP Bayes evaluation value are determined as the final attribute data intervals corresponding to the particular user attribute, the following operations may be performed.

It is determined whether a number of classified members whose attribute data are missing for the particular user attribute is less than a first threshold. If a result of the determination is less than the first threshold, the multiple attribute data intervals with the least MAP Bayes evaluation value are determined as the final attribute data intervals corresponding to the particular user attribute. If the result of the determination is not less than the first threshold, the preset missing value is treated as a separate attribute data interval and a current MAP Bayes evaluation value is calculated. It is then determined whether the current MAP Bayes evaluation value is less than all of the MAP Bayes evaluation values after the preset missing value is merged into each initial attribute data interval respectively. If a result of the determination is that the current MAP Bayes evaluation value is less than all of the MAP Bayes evaluation values after the preset missing value is merged into each initial attribute data interval respectively, the determined initial attribute data intervals and the separate attribute data interval are determined as the final attribute data intervals corresponding to the particular user attribute.

Figure 3:
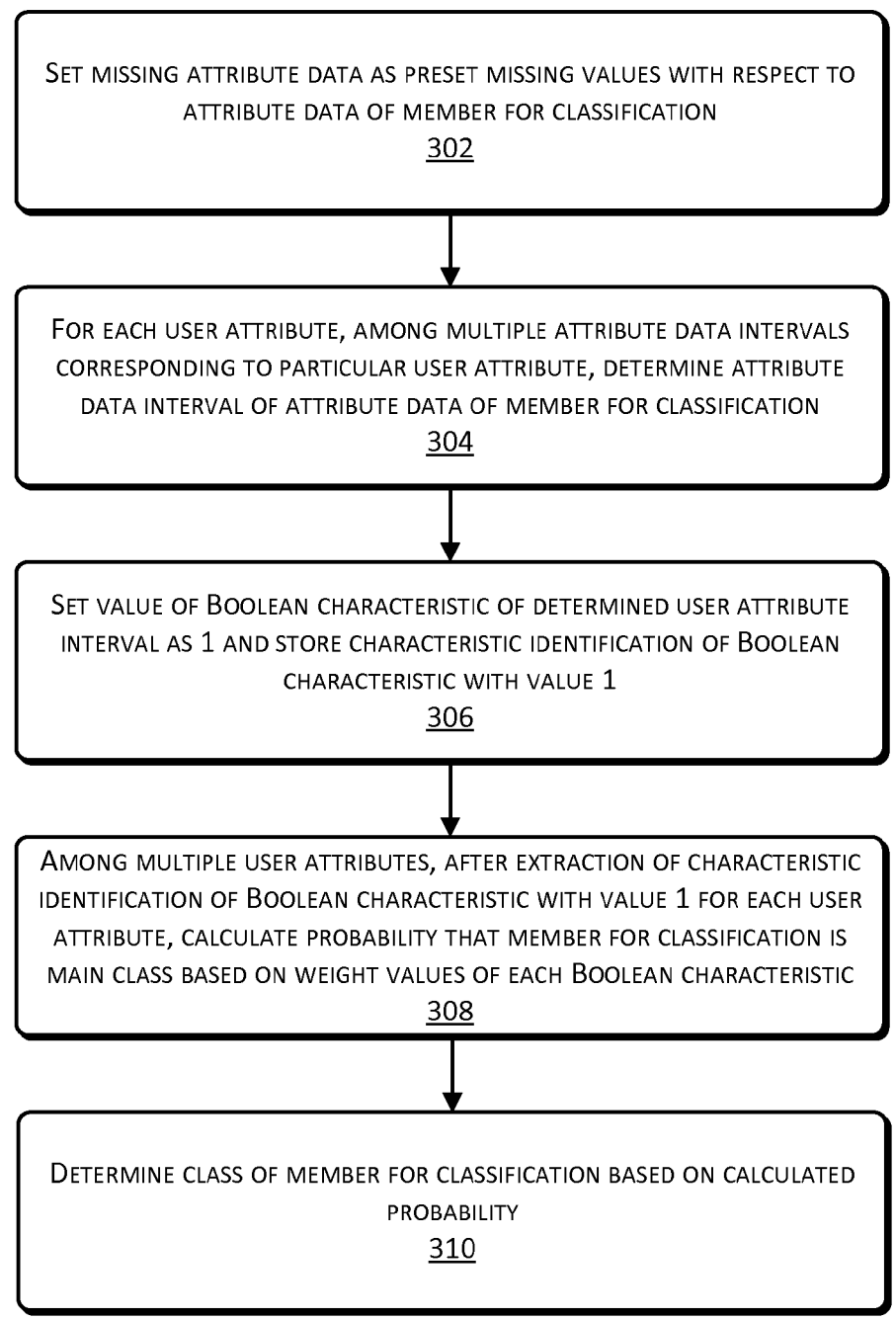
FIG. 3 illustrates a flowchart of an example method of classifying members online in accordance with a second example embodiment of the present disclosure.

Under the present techniques disclosed by the present disclosure, the website may extract the attribute data of one or more classified members for one or more user attributes. For each user attribute, the website determines initial attribute data intervals corresponding to the particular user attribute. With respect to the classified member whose attribute data is missing for the particular attribute, the website sets the attribute data of the classified member for the particular user attributed as a preset missing value, merges the preset missing value into each of the determined initial attribute data intervals respectively, calculates the MAP Bayes evaluation value each time when the respective initial attribute data interval is merged with the preset missing value respectively, and determines the attribute data intervals with a least MAP Bayes evaluation value as the final attribute data intervals corresponding to the particular user attribute. The present techniques, when classifying the attribute data intervals, consider the possibility that the attribute data of one or more classified members for the particular user attribute may be missing, thereby improving the accuracy of classification of the attribute data intervals. The present techniques avoid the inaccuracy problem when there is missing attribute data of the members, thereby improving the accuracy of member classification Corresponding to the method of classifying attribute data intervals as described in the first example embodiment, the following illustrates an online processing of classes of the members for classification. FIG. 3 illustrates a flowchart of an example method of classifying members online in accordance with a second example embodiment of the present disclosure.

At 302, among the attribute data of members for classification for various user attributes, missing attribute data is set as a preset missing value. For instance, the preset missing value is equal to the preset missing value when classifying the attribute data intervals.

At 304, for each user attribute of the members for classification, the user attribute interval of the attribute data of the member for classification, corresponding to the particular user attribute, is determined among multiple attribute data intervals.

For example, if multiple initial attribute data intervals of the particular user attribute are determined offline, each attribute data among the extracted attribute data for the particular user attribute is converted to a corresponding code value and the multiple initial attribute data intervals are then determined corresponding to the particular user attribute. Then prior to operations at 304, for each user attribute of the members for classification, each of the attribute data corresponding to the particular user attribute is replaced by a code value corresponding to the attribute data.

At 306, a Boolean characteristic corresponding to the determined attribute data interval is assigned value 1, and a characteristic identification of the Boolean characteristic with value 1 is stored. For example, each attribute data interval classified offline may be assigned one Boolean characteristic.

At 308, among multiple user attributes, after the characteristic identification corresponding to the Boolean characteristic with value 1 is extracted for each user attribute, based on the weighted value of each Boolean characteristic from each user attribute, a probability of the member for classification is classified into the main class is calculated.

At 310, based on the probability that the particular member for classification is classified into the main class, a class of the particular member for classification is calculated. If the probability is higher than 50%, the particular member for classification is classified into the main class. If the probability is not higher than 50%, the particular member for classification is classified into the secondary class.

The following describes a third example embodiment in accordance with the present disclosure. When the attribute data intervals are classified according to the methods described in the first example embodiment of the present disclosure, if a number of records contained in the classified attribute data intervals is low or does not reach a threshold, the classified attribute data intervals do not have statistical meaning. When the members are classified based on the classified attribute data intervals, the accuracy rate of classification is low. Thus, the third example embodiment of the present disclosure provides another example method of classifying attribute data intervals.

Figure 4:
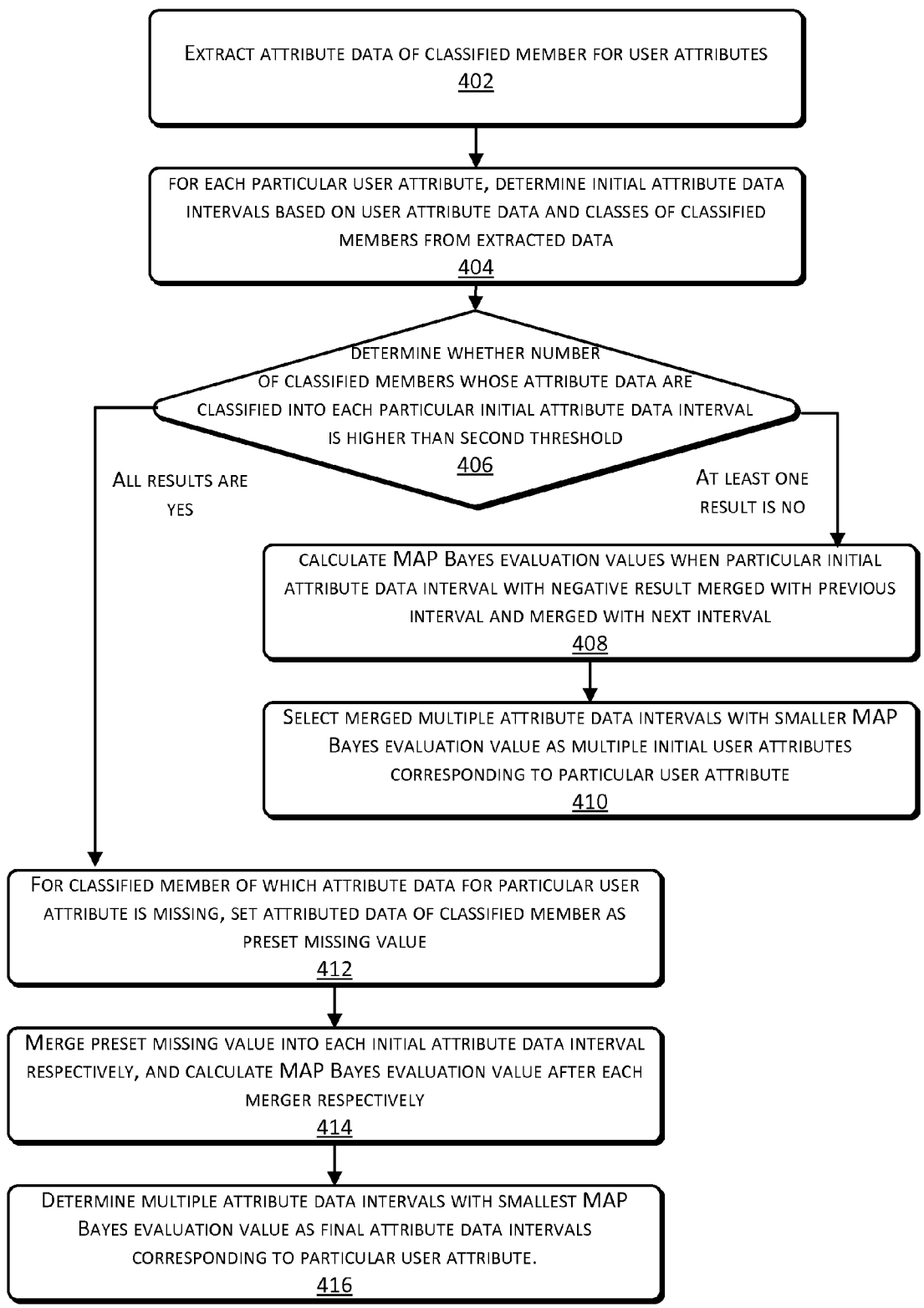
FIG. 4 illustrates a flowchart of another example method of classifying attribute data intervals in accordance with a third example embodiment of the present disclosure.

FIG. 4 illustrates a flowchart of another example method of classifying attribute data intervals in accordance with the third example embodiment of the present disclosure.

At 402, attribute data of multiple classified members for one or more user attributes are extracted. At 404, for each particular user attribute, initial attribute data intervals corresponding to the particular user attribute are determined based on user attribute data corresponding to the particular user attribute and classes of classified members. The operations at 402 and 404 in the third example embodiment of the present disclosure are the same as or similar to those at 202 and 204 in the first example embodiment of the present disclosure. Details of operations at 402 and 404 are not described herein.

At 406, for each determined initial attribute data interval corresponding to the particular user attribute, it is determined whether a number of classified members whose attribute data are classified into the particular initial attribute data interval is higher than a second threshold. If a result of determining for each of the initial attribute data intervals is positive, operations at 412 are performed. If a result of determining for at least one initial attribute data is negative, operations at 408 are performed.

The second threshold may be preset, or be set based on whether the classified initial attribute data intervals have statistics meaning. For example, the second threshold may be set as, but not limited to, 30.

At 408, for each initial user attribute data interval of which the result of determining is negative, the following operations are performed. A MAP Bayes evaluation value when the initial attribute data interval merged with a previous initial attributed data interval and a MAP Bayes evaluation value when the initial attribute data interval merged with a next initial attribute data interval are calculated.

At 410, merged multiple attribute data intervals with smaller MAP Bayes evaluation values are used as the multiple initial user attributes corresponding to the particular user attribute. The determined multiple initial attribute data intervals are selected to meet at least a condition that, for the particular attribute data interval, the number of classified members of which attribute data are classified into the particular attribute data intervals is larger than the second threshold.

At 412, for a classified member of which the attribute data for the particular user attribute is missing, the attributed data of the classified member for the particular user attribute is set as the preset missing value.

At 414, the missing value is merged to each of the determined initial attribute data intervals respectively, and a MAP Bayes evaluation value is calculated respectively each time after the missing value is merged into a respective determined initial attribute data interval.

At 416, multiple attribute data intervals with a smallest MAP Bayes evaluation value are determined as the final attribute data intervals corresponding to the particular user attribute. The operations from 412 to 416 in the third example embodiment of the present disclosure are the same as or similar to those from 206 to 210 in the first example embodiment of the present disclosure. Details are not repeated herein for brevity.

The third example embodiment of the present disclosure considers the scenario that the user attribute data may be missing. When the initial attribute data intervals corresponding to the user attribute are determined, the initial attribute data intervals are not directly used as multiple attribute data intervals corresponding to the particular user attribute. For each determined initial attribute data interval of the particular user attribute, it is determined whether a number of classified members of which attribute data are classified into the particular initial attribute data interval is higher than a second threshold. If a result of determination for at least one initial attribute data interval is negative, for each initial attribute data interval with a negative result, a MAP Bayes evaluation value when the particular initial attribute data interval is merged with a previous initial attributed data interval and a MAP Bayes evaluation value when the particular initial attribute data interval is merged with a next initial attribute data interval are calculated. The merged multiple attribute data intervals with smaller MAP Bayes evaluation value are used as the multiple initial user attributes corresponding to the particular user attribute, and then based on the scenario of missing data in the attribute data, the final attribute data intervals corresponding to the particular user attribute are further determined. As shown in the above third example embodiment of the present disclosure, when the multiple initial attribute data intervals corresponding to the particular user attribute are determined, if a number of classified members whose attribute data are classified into each initial attribute data interval is higher than the second threshold, the attribute data intervals are merged to ensure that the number of classified members in each of the determined multiple initial attribute data intervals is higher than the second threshold. Thus, the classified multiple attribute data intervals have statistical meaning, thereby improving the accuracy of classifying attribute data intervals and further improving the accuracy of classifying members.

Figure 5:
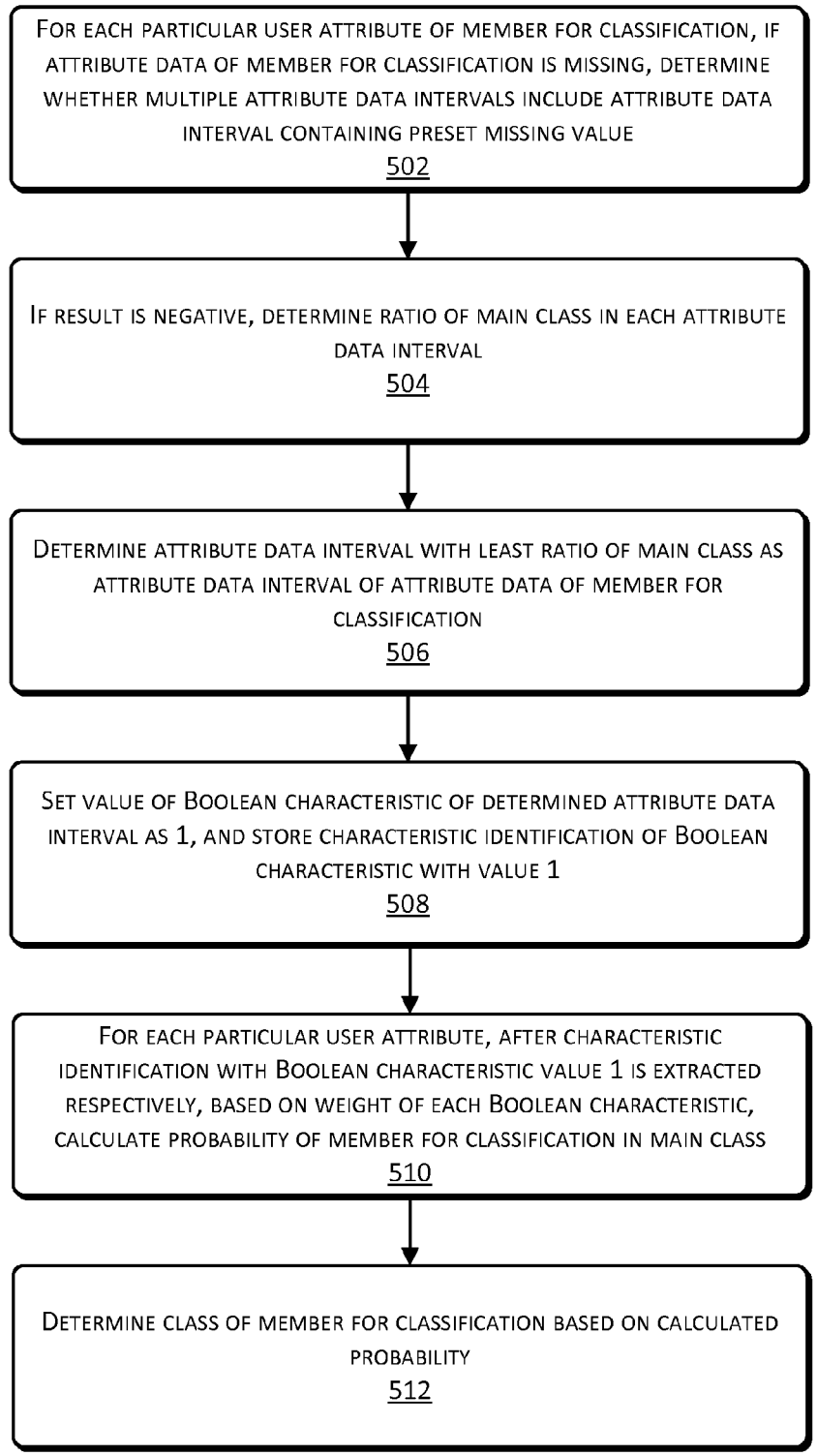
FIG. 5 illustrates a flowchart of another example method of classifying a member for classification online in accordance with a fourth example embodiment of the present disclosure.

The following describes a fourth example embodiment of the present disclosure. When there is missing data in the attribute data of the members for classification while there is no missing data in the attribute data of the classified members, the classified multiple attribute data intervals based on the training data do not have missing value. Thus, the attribute data intervals of the member for classification cannot be determined, and the class of the member for classification cannot be determined. Accordingly, the fourth example embodiment of the present disclosure provides an example method of classifying the member for classification online as shown in FIG. 5.

At 502, for each user attribute of the member for classification, if attribute data of the user attribute of the member for classification is missing, it is determined whether pre-determined multiple attribute data intervals of the particular user attribute include one or more attribute data intervals that contain preset missing value. If a result of determination is positive, the member for classification is classified according to the method described in the second example embodiment of the present disclosure.

At 504, if a result of determination at 502 is negative, a ratio of a main class in each attribute data interval is obtained. For example, the ratio of a main class in each attribute data interval may be determined when the attribute data intervals are classified offline. After the final attribute data intervals are determined, the ratio of a main class, or the ratio of attribute data belonging to the member of a main class, in each attribute data interval is calculated, and a corresponding relationship between each attribute data interval and a ratio of its main class is stored.

At 506, an attribute data interval with a least ratio of main class is determined as the attribute data interval for the particular attribute of attribute data of the member for classification.

At 508, the Boolean characteristic of the determined attribute data interval is set as 1, and the characteristic identification of the Boolean characteristic with value 1 is stored. For example, each of the attribute data intervals classified offline may be assigned a Boolean characteristic.

At 510, for each of the user attributes, after the characteristic identification of which the Boolean characteristic is 1 is extracted respectively, according to the weight value of each of the Boolean characteristics, a probability that the member for classification is classified into the main class is calculated.

At 512, based on the probability that the member for classification is classified into the main class, a class of the member for classification is determined.

Figure 6:
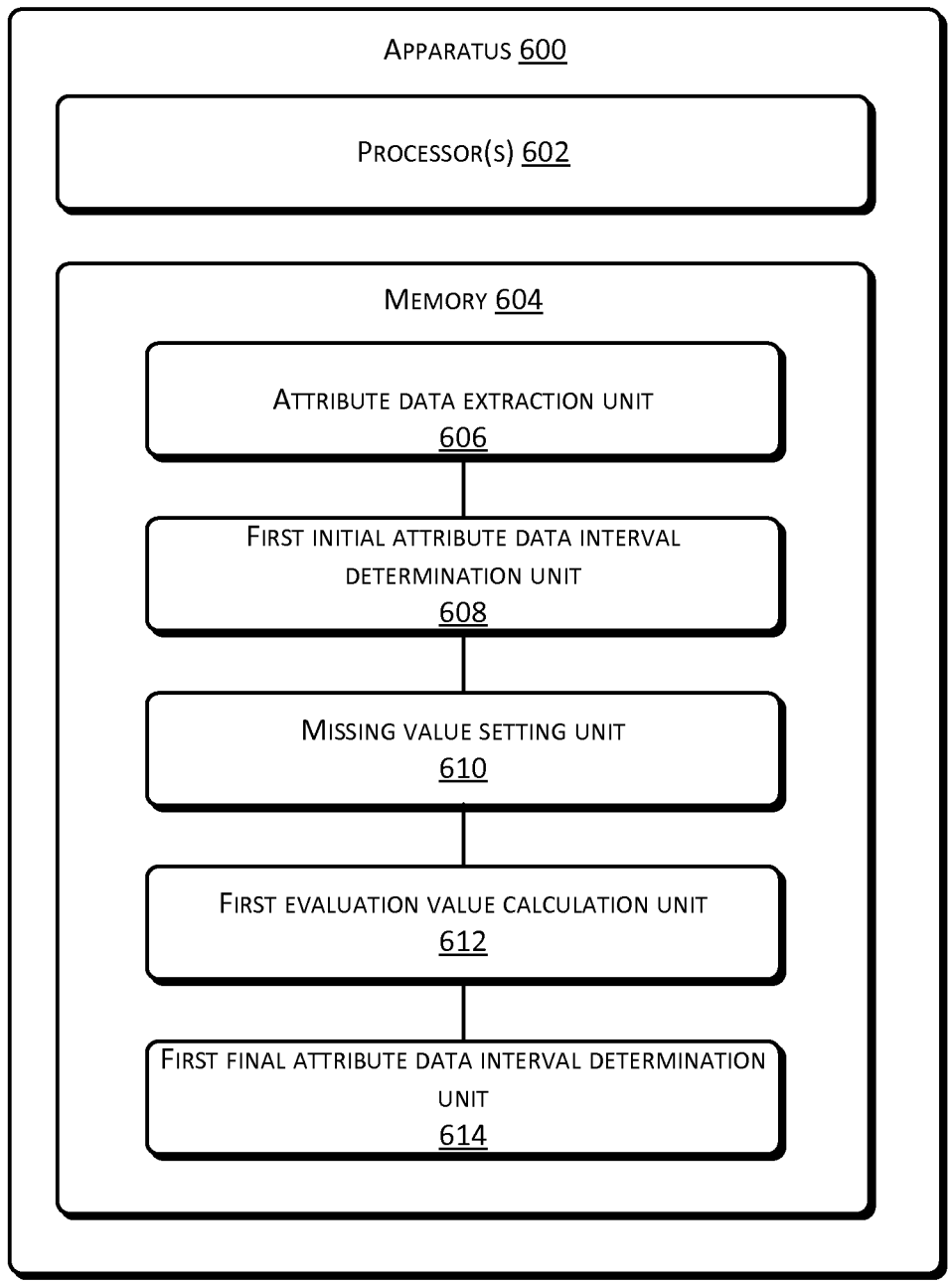
FIG. 6 illustrates an example apparatus of classifying attribute data intervals in accordance with a fifth example embodiment of the present disclosure.

The following describes a fifth example embodiment of the present disclosure. FIG. 6 illustrates an example apparatus 600 of classifying attribute data intervals in accordance with the fifth example embodiment of the present disclosure. In the example of FIG. 6, the apparatus 600 may include, but is not limited to, one or more processor(s) 602 and memory 604. The memory 604 is an example of computer storage media. Computer storage media includes volatile and non-volatile, removable and non-removable media implemented in any method or technology for storage of information such as computer-executable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer storage media does not include transitory media such as modulated data signals and carrier waves.

The memory 604 may store therein program units or modules and program data. In the example of FIG. 6, the memory 604 may store therein an attribute data extraction unit 606, a first initial attribute data interval determination unit 608, a missing value setting unit 610, a first evaluation value calculation unit 612, and a first final attribute data interval determination unit 614.

The attribute data extraction unit 606 extracts attribute data of multiple classified members for one or more user attributes. The first initial attribute data interval determination unit 608, for each particular user attribute, determines initial attribute data intervals corresponding to the particular user attribute based on user attribute data corresponding to the particular user attribute extracted by the attribute data extraction unit 606 and classes of classified members.

The missing value setting unit 610, for a classified member whose attribute data is missing for the particular user attribute, sets the attribute data of the classified member corresponding to the particular user attribute as a preset missing value.

The first evaluation calculation unit 612, merges the preset missing value into each initial attribute data interval determined by the first initial attribute data interval determination unit 608 respectively, and calculates the MAP Bayes evaluation value of the initial user attribute data intervals each time after the preset missing value is merged into one initial attribute data interval respectively.

The first final attribute data interval determination unit 614 determines the initial attribute data intervals with the smallest MAP Bayes evaluation value from each merger as the final attribute data intervals corresponding to the particular user attribute.

For example, the memory 604 may also store therein a first number determination unit. Before the first final attribute data interval determination unit 614 determines the initial attribute data intervals with the smallest MAP Bayes evaluation value from each merger as the final attribute data intervals corresponding to the particular user attribute, the first number determination unit determines whether a number of classified members whose attribute data are missing for the particular user attribute is less than a first threshold.

If the number of classified members whose attribute data are missing for the particular user attribute is less than the first threshold, the first final attribute data interval determination unit 614 determines the initial attribute data intervals with the smallest MAP Bayes evaluation value from each merger calculated by the first evaluation value calculation unit 612 as the final attribute data intervals corresponding to the particular user attribute.

For another example, the memory 604 may also store therein a second evaluation value calculation unit, an evaluation value determination unit, and a second final attribute data interval determination unit.

If the number of classified members whose attribute data are missing for the particular user attribute is not less than the first threshold, the second evaluation value determination unit treats the missing value as a separate attribute data interval and calculates a current MAP Bayes evaluation value.

The evaluation value determination unit determines whether the current MAP Bayes evaluation value calculated by the second evaluation value determination unit is less than all of the MAP Bayes evaluation values after the missing value is merged into each initial attribute data interval calculated by the first evaluation value calculation unit 612.

If a result of the determination is that the current MAP Bayes evaluation value is less than all of the MAP Bayes evaluation values after the missing value is merged into each initial attribute data interval respectively, the second final attribute data interval determination unit determines the initial attribute data intervals determined by the first initial attribute data interval determination unit 608 and the separate attribute data interval as the final attribute data intervals corresponding to the user attribute.

If a result of the determination is that the current MAP Bayes evaluation value is not less than all of the MAP Bayes evaluation values after the missing value is merged into each initial attribute data interval, the first final attribute data interval determination unit 614 determines the attribute data intervals with the smallest MAP Bayes evaluation value calculated by the first evaluation value calculation unit 612 as the final attribute data intervals corresponding to the particular user attribute.

For another example, the memory 604 may also store therein a second number determination unit, a third evaluation value calculation unit, and a second initial attribute data interval determination unit.

Before the missing value setting unit 610, with respect to the classified member whose attribute data is missing for the particular user attribute, sets the attribute data of the classified member corresponding to the particular user attribute as the preset missing value, the second number determination unit determines whether a number of classified members whose attribute data are classified into each initial attribute data interval corresponding to the particular user attribute is higher than a second threshold. Each initial attribute data interval of the particular user attribute is determined by the first initial attribute data interval determination unit 608.

If results of determination made by the second number determination unit for all of the initial attribute data intervals are positive, the missing value setting unit 610, with respect to the classified members whose attribute data are missing for the particular user attribute, sets the attribute data of the classified members corresponding to the particular user attribute as the preset missing value.

If at least one result of determination made by the second number determination unit for all of the initial attribute data intervals is negative, the third evaluation value calculation unit, with respect to each initial user attribute data interval with the negative result, calculates a MAP Bayes evaluation value when such initial user attribute data interval is merged with a previous initial attributed data interval and a MAP Bayes evaluation value when such initial user attribute data interval is merged with a next initial attribute data interval.

The second initial attribute data interval determination unit selects the merged attribute data intervals with smaller MAP Bayes evaluation value calculated by the third evaluation value determination unit as the initial attribute data intervals corresponding to the particular user attribute.

In one example, the first initial attribute data interval determination unit 608 may include a code value conversion sub-unit and an initial attribute data interval determination sub-unit. The code value conversion sub-unit converts each attribute data of the particular user attribute extracted by the attribute data extraction unit 606 to a corresponding code value. The initial attribute data interval determination sub-unit determines the initial attribute data intervals corresponding to the particular user attribute based on the coded values converted by the code valuation conversion sub-unit and the classes of the classified members.

For example, if the attribute data of the particular user attribute is number-type attribute data, with respect to each attribute data of the particular user attribute extracted from the attribute data, the code value conversions unit may use the value of the attribute data as its corresponding code value.

For another example, if the attribute data of the particular user attribute is date-type attribute data, with respect to each attribute data of the particular user attribute extracted from the attribute data, the code value conversion unit may use the time length between the time of the attribute data and the current time as the code value of the attribute data.

For another example, if the attribute data of the particular user attribute is set-type attribute data, with respect to each attribute data of the particular user attribute extracted from the attribute data, the code value conversion unit may calculate a ratio value that a respective attribute data belongs to the main class, ranks the attribute data of the particular attribute based on the ratio value from high to low, and uses a ranking sequence number after the ranking as the corresponding code value of the respective attribute data with respect to each attribute data of the particular user attribute extracted from the attribute data.

Persons skilled in the art should understand that the embodiments of the present disclosure can be methods, systems, or the programming products of computers. Therefore, the present disclosure can be implemented by hardware, software, or in combination of both. In addition, the present disclosure can be in a form of one or more computer programs containing the computer-executable or processor-executable instructions that can be implemented in the computer storage medium (including but not limited to disks, CD-ROM, optical disks, etc.).

The present disclosure is described by referring to the flow charts and/or block diagrams of the method, device (system) and computer program of the embodiments of the present disclosure. It should be understood that each flow and/or block and the combination of the flow and/or block of the flowchart and/or block diagram can be implemented by computer program instructions. These computer program instructions can be provided to the general computers, specific computers, embedded processor or other programmable data processors to generate a machine, so that a device of implementing one or more flows of the flow chart and/or one or more blocks of the block diagram can be generated through the instructions operated by a computer or other programmable data processors.

These computer program instructions can also be stored in other computer storage media which can instruct a computer or other programmable data processors to operate in a certain way, so that the instructions stored in the computer-readable storage generate a product containing the instruction device, wherein the instruction device implements the functions specified in one or more flows of the flow chart and/or one or more blocks of the block diagram.

These computer program instructions can also be loaded in a computer or other programmable data processors, so that the computer or other programmable data processors can operate a series of operation steps to generate the process implemented by a computer. Accordingly, the instructions operated in the computer or other programmable data processors can provides the steps for implementing the functions specified in one or more flows of the flow chart and/or one or more blocks of the block diagram.

The embodiments are merely for illustrating the present disclosure and are not intended to limit the scope of the present disclosure. It should be understood for persons in the technical field that certain modifications and improvements can be made and should be considered under the protection of the present disclosure without departing from the principles of the present disclosure.

What is claimed is:

1. A method performed by one or more processors configured with computer-executable instructions, the method comprising:
    extracting attribute data of one or more classified members for one or more user attributes;
    with respect to a particular user attribute of the one or more user attributes,
        determining one or more initial user attribute data intervals corresponding to the particular user attribute based on attribute data and classes of the classified members from the extracted attribute data;
        with respect to a classified member whose attribute data is missing for the particular user attribute, setting attribute data of the classified member as a preset missing value;
        merging the preset missing value into each of the one or more initial user attribute data intervals respectively;
        calculating a Maximum Posteriori Probability (MAP) Bayes estimate value each time when the preset missing value is merged into each of the one or more initial user attribute data intervals respectively; and
        determining initial user attribute data intervals with a smallest MAP Bayes estimated value as final attribute data intervals corresponding to the particular user attribute.

2. The method as recited in claim 1, further comprising:
    prior to determining the initial user attribute data intervals with the smallest MAP Bayes estimated value as the final attribute data intervals corresponding to the particular user attribute, determining whether a number of classified members whose user attribute data is missing for the particular user attribute is less than a first threshold;
    in response to determining that the number of classified members whose user attribute data is missing for the particular user attribute is less than the first threshold, determining the initial user attribute data intervals with the smallest MAP Bayes estimated value as the final attribute data intervals corresponding to the particular user attribute.

3. The method as recited in claim 2, further comprising:
    in response to determining that the number of classified members whose user attribute data is missing for the particular user attribute is not less than the first threshold, treating the preset missing value as a separate attribute data interval;
    calculating a MAP Bayes value when the preset missing value is treated as the separate attribute data interval;
    determining whether the MAP Bayes value when the preset missing value is treated as the separate attribute data interval is smaller than each of MAP Bayes estimated values when the preset missing value is merged into each of the initial user attribute data intervals respectively;
    in response to determining that the MAP Bayes value when the preset missing value is treated as the separate attribute data interval is smaller than each of the MAP Bayes estimated values when the preset missing value is merged into each of the initial user attribute data intervals respectively, using the determined initial user attribute intervals and the separate attribute data interval as the final attribute data intervals corresponding to the particular user attribute; and
    in response to determining that the MAP Bayes value when the preset missing value is treated as the separate attribute data interval is not smaller than each of the MAP Bayes estimated values when the preset missing value is merged into each of the initial user attribute data intervals respectively, determining the initial user attribute data intervals with the smallest MAP Bayes estimated value as the final attribute data intervals corresponding to the particular user attribute.

4. The method as recited in claim 1, further comprising:
    when determining a class of a member for classification, with respect to each user attribute of the member for classification, if attribute data of the member for classification is missing for the particular user attribute, setting the attribute data of the member for classification for the particular user attribute as a preset missing value;
    selecting an attribute data interval for the preset missing value among the user attribute data intervals corresponding to the particular user attribute; and
    determining the class of the member for classification based on attribute data intervals selected for each user attribute.

5. The method as recited in claim 1, further comprising:
    with respect to the classified member whose attribute data is missing for the particular user attribute, prior to setting attribute data of the classified member as the preset missing value,
    for each respective initial attribute data interval, determining whether a number of classified members whose attribute data in the respective initial attribute data interval is higher than a second threshold;
    in response to determining that the number of classified members whose attribute data in each initial attribute data interval is higher than the second threshold, setting attribute data of the classified member as a preset missing value;
    in response to determining that the number of classified members whose attribute data in at least one initial attribute data interval is not higher than the second threshold, for a respective attribute data interval of the at least one interval data intervals, calculate a MAP Bayes value when the respective attribute data interval is merged with a preceding attribute data interval and a MAP Bayes value when the respective attribute data interval is merged with a next attribute data interval; and
    using merged attribute data intervals with a lower MAP Bayes value as the initial attribute data intervals of the particular user attribute.

6. The method as recited in claim 1, wherein the determining one or more initial user attribute data intervals corresponding to the particular user attribute based on attribute data and classes of the classified members comprises:
    converting respective attribute data of the particular user attribute from the extracted data into a corresponding code value; and
    determining the initial user attribute data intervals based on converted code values and the classes of the classified members.

7. The method as recited in claim 6, wherein the converting each attribute data of the particular user attribute from the extracted data into a corresponding code value comprises:
    determining that the respective attribute data of the particular user attribute is number-type attribute data; and
    using value of the respective attribute data as the corresponding code value.

8. The method as recited in claim 6, wherein the converting each attribute data of the particular user attribute from the extracted data into a corresponding code value comprises:
   determining that the respective attribute data of the particular user attribute is date-type attribute data; and
   using a time length between the date of the respective attribute data and a current date as the corresponding code value.

9. The method as recited in claim 6, wherein the converting each attribute data of the particular user attribute from the extracted data into a corresponding code value comprises:
   determining that the respective attribute data of the particular user attribute is set-type attribute data;
   calculating a ratio value that the respective data belongs to the main class;
   ranking each attribute data for the particular user attribute according to ratio values; and
   using a ranking number of the respective attribute data as the corresponding code value of the respective attribute data.

10. An apparatus comprising:
    a data extraction unit that extracts attribute data of one or more classified members for one or more user attributes;
    a first initial attribute data interval determination unit that, with respect to a particular user attribute of the one or more user attributes, determines one or more initial user attribute data intervals corresponding to the particular user attribute based on attribute data and classes of the classified members from the extracted attribute data;
    a missing value setting unit that, with respect to a classified member whose attribute data is missing for the particular user attribute, setting attribute data of the classified member as a preset missing value;
    a first evaluation value calculation unit that merges the preset missing value into each of the one or more initial user attribute data intervals respectively and calculates a Maximum Posteriori Probability (MAP) Bayes estimate value each time when the preset missing value is merged into each of the one or more initial user attribute data intervals respectively; and
    a first final attribute data interval determination unit that determines initial user attribute data intervals with a smallest MAP Bayes estimated value as final attribute data intervals corresponding to the particular user attribute.

11. The apparatus as recited in claim 10, further comprising:
    a first number determination unit that, prior to that the first final attribute data interval determination unit determines the initial user attribute data intervals with the smallest MAP Bayes estimated value as the final attribute data intervals corresponding to the particular user attribute, determines whether a number of classified members whose user attribute data is missing for the particular user attribute is less than a first threshold; and
    the first final attribute data interval determination unit that, after the first number determination unit determines that the number of classified members whose user attribute data is missing for the particular user attribute is less than the first threshold, determines the initial user attribute data intervals with the smallest MAP Bayes estimated value as the final attribute data intervals corresponding to the particular user attribute.

12. The apparatus as recited in claim 11, further comprising:
    a second evaluation value calculation unit that, when the first number determination unit determines that the number of classified members whose user attribute data is missing for the particular user attribute is not less than the first threshold, treats the preset missing value as a separate attribute data interval and calculates a MAP Bayes value when the preset missing value is treated as the separate attribute data interval;
    an evaluation value determination unit that determines whether the MAP Bayes value calculated by the second evaluation calculation unit is smaller than each of MAP Bayes estimated values calculated by the first evaluation value calculation unit when the preset missing value is merged into each of the initial user attribute data intervals respectively;
    a second final attribute data interval determination unit that, in response to determining that the MAP Bayes value calculated by the second evaluation calculation unit is smaller than each of the MAP Bayes estimated values calculated by the first evaluation value calculation unit when the preset missing value is merged into each of the initial user attribute data intervals respectively, uses the initial user attribute intervals determined by the first initial attribute data interval determination unit and the separate attribute data interval as the final attribute data intervals corresponding to the particular user attribute; and
    the first final attribute data interval determination unit that, in response to determining that the MAP Bayes value calculated by the second evaluation calculation unit is not smaller than each of the MAP Bayes estimated values calculated by the first evaluation value calculation unit when the preset missing value is merged into each of the initial user attribute data intervals respectively, determines the initial user attribute data intervals with the smallest MAP Bayes estimated value calculated by the first evaluation value calculation unit as the final attribute data intervals corresponding to the particular user attribute.

13. The apparatus as recited in claim 10, further comprising:
    for each respective initial attribute data interval, a second number determination unit that, prior to that the missing value setting unit sets attribute data of the classified member as the preset missing value, determines whether a number of classified members having attribute data in the respective initial attribute data interval is higher than a second threshold;
    the missing value setting unit, when it is determined that the second number determination unit determines that the number of classified members having attribute data in each initial attribute data interval is higher than the second threshold, sets attribute data of the classified member as the preset missing value;
    a third evaluation value calculation unit, when it is determined that the second number determination unit determines that the number of classified members having attribute data in at least one initial attribute data interval is not higher than the second threshold, with respect to a respective attribute data interval of the at least one interval data intervals, calculate a MAP Bayes value when the respective attribute data interval is merged with a preceding attribute data interval and a MAP Bayes value when the respective attribute data interval is merged with a next attribute data interval; and
    a second initial attribute data interval determination unit that determines merged attribute data intervals with a lower MAP Bayes value calculated by the third evaluation value calculation unit as the initial attribute data intervals of the particular user attribute.

14. The apparatus as recited in claim 10, wherein the first initial attribute data interval determination unit comprises:
a code value conversion sub-unit that converts respective attribute data of the particular user attribute from the extracted data into a corresponding code value; and
an initial attribute data interval determination sub-unit that determines the initial user attribute data intervals based on converted code values and the classes of the classified members.

15. The apparatus as recited in claim 14, wherein the code value conversion unit further determines that the respective attribute data of the particular user attribute is number-type attribute data and uses value of the respective attribute data as the corresponding code value.

16. The apparatus as recited in claim 14, wherein the code value conversion unit further determines that the respective attribute data of the particular user attribute is date-type attribute data and uses a time length between the date of the respective attribute data and a current date as the corresponding code value.

17. The apparatus as recited in claim 14, wherein the code value conversion unit further determines that the respective attribute data of the particular user attribute is set-type attribute data;
calculates a ratio value that the respective data belongs to the main class;
ranks each attribute data for the particular user attribute according to ratio values; and
uses a ranking number of the respective attribute data as the corresponding code value of the respective attribute data.

18. One or more computer storage media having stored thereon computer executable components that are executable by one or more processors to perform actions comprising:
extracting attribute data of one or more classified members for one or more user attributes;
with respect to a particular user attribute of the one or more user attributes, determining one or more initial user attribute data intervals corresponding to the particular user attribute based on attribute data and classes of the classified members from the extracted attribute data;
with respect to a classified member whose attribute data is missing for the particular user attribute, setting attribute data of the classified member as a preset missing value;
merging the preset missing value into each of the one or more initial user attribute data intervals respectively;
calculating a Maximum Posteriori Probability (MAP) Bayes estimate value each time when the preset missing value is merged into each of the one or more initial user attribute data intervals respectively; and
determining initial user attribute data intervals with a smallest MAP Bayes estimated value as final attribute data intervals corresponding to the particular user attribute.

19. The one or more computer storage media as recited in claim 18, wherein the actions further comprise:
prior to determining the initial user attribute data intervals with the smallest MAP Bayes estimated value as the final attribute data intervals corresponding to the particular user attribute,
determining whether a number of classified members whose user attribute data is missing for the particular user attribute is less than a first threshold;
in response to determining that the number of classified members whose user attribute data is missing for the particular user attribute is less than the first threshold, determining the initial user attribute data intervals with the smallest MAP Bayes estimated value as the final attribute data intervals corresponding to the particular user attribute.

20. The one or more computer storage media as recited in claim 19, wherein the actions further comprise:
in response to determining that the number of classified members whose user attribute data is missing for the particular user attribute is not less than the first threshold, treating the preset missing value as a separate attribute data interval;
calculating a MAP Bayes value when the preset missing value is treated as the separate attribute data interval;
determining whether the MAP Bayes value when the preset missing value is treated as the separate attribute data interval is smaller than each of MAP Bayes estimated values when the preset missing value is merged into each of the initial user attribute data intervals respectively;
in response to determining that the MAP Bayes value when the preset missing value is treated as the separate attribute data interval is smaller than each of the MAP Bayes estimated values when the preset missing value is merged into each of the initial user attribute data intervals respectively, using the determined initial user attribute intervals and the separate attribute data interval as the final attribute data intervals corresponding to the particular user attribute; and
in response to determining that the MAP Bayes value when the preset missing value is treated as the separate attribute data interval is not smaller than each of the MAP Bayes estimated values when the preset missing value is merged into each of the initial user attribute data intervals respectively, determining the initial user attribute data intervals with the smallest MAP Bayes estimated value as the final attribute data intervals corresponding to the particular user attribute.

* * * * *